(12) United States Patent
Deltour et al.

(10) Patent No.: US 8,934,515 B2
(45) Date of Patent: Jan. 13, 2015

(54) METHOD AND NETWORK FOR DATA TRANSMISSION BETWEEN A PLURALITY OF RADIO STATIONS

(75) Inventors: Bruno Deltour, Gennevilliers (FR); Yves Singlas, Gennevilliers (FR); Jean-Baptiste Chantelouve, Gennevilliers (FR)

(73) Assignee: Thales, Neuilly sur Seine (FR)

(*) Notice: Subject to any disclaimer, the term of this patent is extended or adjusted under 35 U.S.C. 154(b) by 145 days.

(21) Appl. No.: 13/702,446

(22) PCT Filed: Jun. 7, 2011

(86) PCT No.: PCT/FR2011/051284
§ 371 (c)(1),
(2), (4) Date: Dec. 6, 2012

(87) PCT Pub. No.: WO2011/154651
PCT Pub. Date: Dec. 15, 2011

(65) Prior Publication Data
US 2013/0077654 A1    Mar. 28, 2013

(30) Foreign Application Priority Data
Jun. 7, 2010 (FR) ..................................... 10 02395

(51) Int. Cl.
*H04B 1/7156*   (2011.01)
*H04B 1/715*    (2011.01)

(52) U.S. Cl.
CPC .............. *H04B 1/7156* (2013.01); *H04B 1/715* (2013.01)
USPC ........................................................ 375/132

(58) Field of Classification Search
CPC .... H04B 1/713; H04B 1/7143; H04B 1/7156; H04B 2001/713; H04L 1/1867
USPC ................. 375/132, E1.035, E1.034, E1.033
See application file for complete search history.

(56) References Cited

U.S. PATENT DOCUMENTS

2006/0140251 A1* 6/2006 Brown et al. ................. 375/135
2006/0199531 A1* 9/2006 Williamson et al. ......... 455/11.1
2006/0245470 A1* 11/2006 Balachandran et al. ...... 375/133

(Continued)

OTHER PUBLICATIONS

Pascale Minet et al.:"Routage Dynamique sur Liens HF", Dec. 1, 2006 (44 pages), p. 7, France, see translation of International Search Report of PCT/FR2011/051284.

(Continued)

*Primary Examiner* — Aristocratis Fotakis
(74) *Attorney, Agent, or Firm* — Davidson, Davidson & Kappel, LLC

(57) ABSTRACT

A method is provided for transmitting data between a plurality of radio stations of one same network, each station having a transmitter and a receiver. The method includes a first transmission mode in which the network operates with frequency hopping in a first frequency plan, the frequency used for data transmission being maintained for a FH dwell time, and changing from one FH dwell time to another as per a law of frequency change; a second transmission mode in a second frequency plan in which a transmitter station (A) transmits data on a fixed frequency to a receiver station (B), the second mode comprising a step (120) to determine the fixed frequency, the determination step comprising the transmission of a test word on each frequency of the second plan for a respective test dwell time. The duration of the test dwell time is equal to the duration of the FH dwell time multiplied by an integer factor of value between 1 and 6.

13 Claims, 3 Drawing Sheets

(56) References Cited

U.S. PATENT DOCUMENTS

2008/0198786 A1\* 8/2008 Nieto et al. .................. 370/315
2010/0080311 A1\* 4/2010 Moffatt et al. ............... 375/260
2013/0051430 A1\* 2/2013 Deltour et al. ............... 375/134

OTHER PUBLICATIONS

Koski et al.:Concepts for a reliable multicast data link protocol for HF radio communications, Military Communications Conference, 2005, Milcom 2005. IEEE Atlantic City, NJ, USA, Oct. 17, 2005—Feb. 1, 2000 pp. 1 to 7, IEEE Piscataway, NJ, USA.

\* cited by examiner

METHOD AND NETWORK FOR DATA TRANSMISSION BETWEEN A PLURALITY OF RADIO STATIONS

The present invention concerns a method for transmitting data between a plurality of radio stations of a same network, each station comprising a transmitter and a receiver, the method comprising:

a first data transmission mode wherein the network functions by frequency hopping (FH) in a first frequency plan, the frequency used for data transmission being maintained for a FH dwell time, and changing from one FH dwell time to another in accordance with a law of frequency change;

a second data transmission mode in a second frequency plan wherein a transmitter station among the plurality of stations transmits data on a fixed frequency to a receiver station among the plurality of stations, the second mode comprising a determination step to determine the fixed frequency, the determination step comprising the transmission of a test word on each frequency of the second frequency plan during a respective test dwell time.

The present invention concerns a transmission network comprising a plurality of radio stations, each station comprising a transmitter and a receiver, each station being capable of transmitting data according to a first mode in which the network operates with frequency hopping in a first frequency plan, the frequency used for data transmission being maintained for a FH dwell time and changing from one FH dwell time to another according to a law of frequency change, each station being able to transmit data in a second frequency plan according to a second mode in which a transmitter station among the plurality of stations transmits data on a fixed frequency to a receiver station, each station comprising means to determine the fixed frequency, the determination means being capable of commanding the transmission of a test word on each frequency of the second frequency plan during a respective test dwell time.

BACKGROUND OF THE INVENTION

A transmission method of the aforementioned type is known. The STANAG-4444 standard describes a time structure comprising a first TS1 and a second TS2 time slot with permanent alternation between these two time slots when the transmission network is on standby. The first time slot TS1 is necessarily allocated to a frequency hopping transmission mode of the STANAG-4444 standard. The second time slot TS2 can be allocated to any transmission mode, in particular to another transmission mode in fixed frequency, as provided by standard STANAG 4538 describing the combined use of the STANAG-4444 standard and standards relating to fixed frequency transmission such as the MIL-STD-188-141 standard.

The frequency hopping transmission mode, FH, is generally used for half-duplex data transmission sent to all the stations, and the fixed frequency transmission mode is designed for transmitting data at a high bit rate of up to 19200 bits per second, the FH mode having a transmission rate limited to 2400 bits per second.

However, the duration of the changeover from one transmission mode to the other is particularly lengthy, which places constraints on users who therefore avoid having to change from one mode to the other but benefit less from the advantages offered by each of the transmission modes.

BRIEF SUMMARY OF THE INVENTION

It is an object of the present invention to provide a transmission method which allows the easy use of both transmission modes, by using a transmission mode best adapted to the characteristics of a desired service, the service for example being voice communication, the transmission of a few data words or the transmission of a large quantity of data.

The present invention provides a transmission method of the aforementioned type, characterized in that the duration of the test dwell time is equal to the duration of the FH dwell time multiplied by an integer factor, the value of the integer factor being between 1 and 6.

According to other embodiments, the transmission method comprises one or more of the following characteristics taken alone or in any technically possible combination:

the duration of the test dwell time is equal to the duration of the FH dwell time, the multiplying factor being 1;

the second data transmission mode also comprises a verification step by the transmitter station of the availability of the receiver station, the verification step preceding the step to determine the fixed frequency;

the step to determine the fixed frequency comprises the transmitting of a call word by the transmitter station to the receiver station, then the transmitting of a response word by the receiver station to the transmitter station, the call word and the response word being transmitted on each frequency of the second frequency plan, the determined frequency being the frequency having the best quality of reception of the call word and of the response word;

the transmitter station transmits data to the receiver station on a first fixed frequency, and the receiver station transmits data to the transmitter station on a second fixed frequency;

the first fixed frequency is the frequency having the best quality of reception of the call word, and the second fixed frequency is the frequency having the best quality of reception of the response word;

the second fixed frequency has a different value from the value of the first fixed frequency;

the second fixed frequency has an identical value to the value of the first fixed frequency;

the first transmission mode has a first maximum transmission rate, and the second transmission mode has a second maximum transmission rate of higher value than the value of the first maximum rate; and the transmitter station and the receiver station automatically return to the first transmission mode after the transmission of data in the second transmission mode.

A further subject of the invention is a transmission network of the aforementioned type, characterized in that the duration of the test dwell time is equal to the duration of the FH dwell time multiplied by an integer factor, the value of the integer factor being between 1 and 6.

BRIEF DESCRIPTION OF THE SEVERAL VIEWS OF THE DRAWING(S)

These characteristics and advantages of the invention will become apparent on reading the following description given solely as a non-limiting example and with reference to the appended drawings in which.

DETAILED DESCRIPTION OF THE INVENTION

Figure 1:
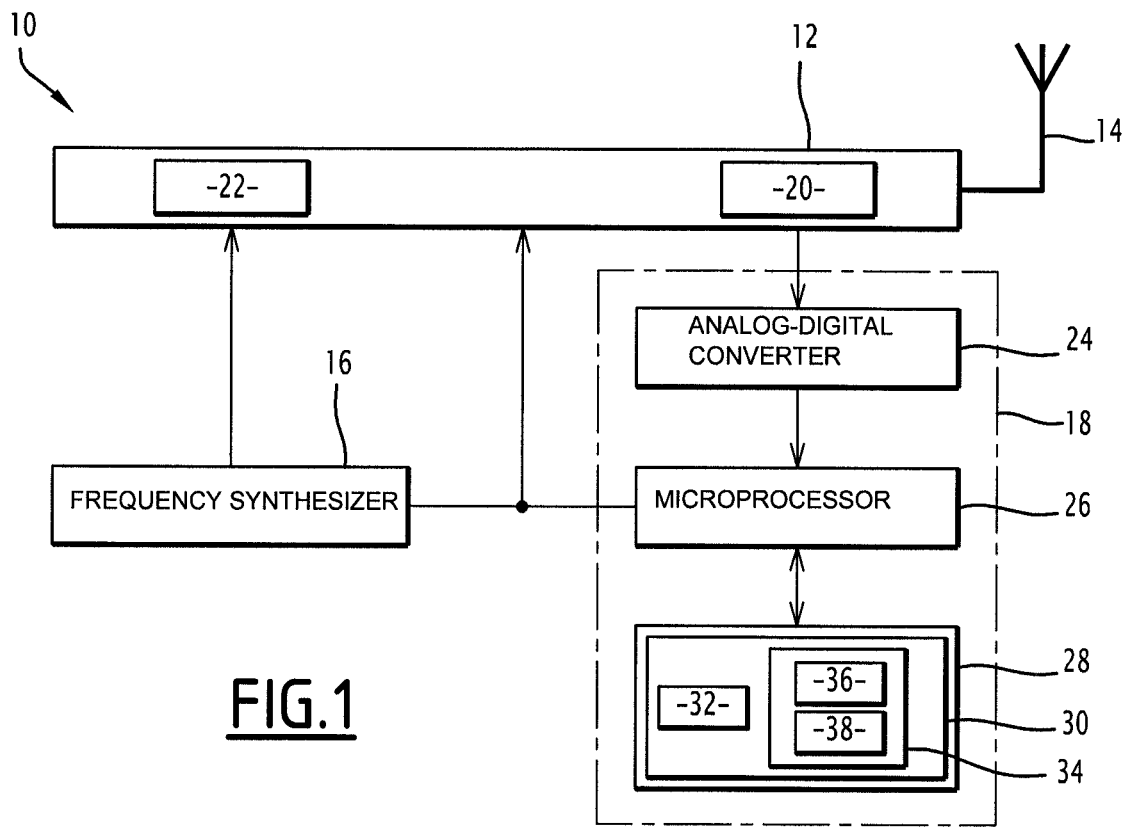
FIG. 1 is a schematic illustration of a transmitter-receiver of a transmission network according to the invention.

A transmission network according to the invention comprises a plurality of radio stations 10 and is capable of operating with frequency hopping and with a fixed frequency. One station is illustrated in FIG. 1.

All the frequencies which can be used by the transmission network comprise a first frequency plan, hereinafter called FH (Frequency Hopping) plan for frequency hopping operation, and a second frequency plan for fixed frequency operation. The first and second frequency plans belong to the high frequency spectrum for example, also called the HF spectrum of between 1.5 MHz and 30 MHz. The first and second frequency plans are predetermined frequency plans for example. The first and second frequency plans may be identical for example. As a variant, the second frequency plan is different from the first plan. The first and second frequency plans are hereafter respectively called the FH plan and ALE plan (Automatic Link Establishment).

The transmission network is for example a network having a transmission rate of less than 20 kbits per second.

The number of radio stations 10 is equal to or higher than three for example, each station 10 being capable of half-duplex data transmission sent to all the other stations 10 of the network.

Each station 10, in manner known per se and as illustrated in FIG. 1, comprises a transmit-receive chain 12, an antenna 14, a frequency synthesizer 16 and a processing unit 18.

The transmit-receive chain 12 is connected to the transmit-receive antenna 14, to the frequency synthesizer 16 and to the processing unit 18, the frequency synthesizer 16 and the processing unit 18 also being connected together.

The transmit-receive chain 12 comprises a device 20 for receiving radio signals from the antenna 14 and a device 22 for transmitting radio signals to the antenna 14. The transmit-receive chain 12 is able to be driven in known manner by the frequency synthesizer 16.

The processing unit 18 comprises an analogue-digital converter 24 connected to the output of the receiver device 20 of the transmit-receive chain, a microprocessor 26 connected to the output of the analogue-digital converter 24 and a memory 28 connected to the microprocessor 26.

The analogue-digital converter 24 is capable of converting the voltage or current level supplied by the receiver device 20 into digital signal samples transmitted to the microprocessor 26.

The microprocessor 26 is connected to the frequency synthesizer 16 and to the transmit-receive chain 12 to transmit radio signals to other transmitters-receivers 10 of the transmission network.

The memory 28 comprises software 30 to transmit data to the other stations 10.

The transmission software 30 comprises a first data transmission function 32 according to a first transmission mode, called FH mode, in which the network functions with frequency hopping in the first frequency plan. The transmission software 30 also comprises a second data transmission function 34 according to a second data transmission mode in the second frequency plan, in which the station 10, then called the transmitter station, is capable of transmitting data on a fixed frequency to another station 10 from among the plurality of stations, which is then called the receiver station. The second transmission function 34 comprises a verification sequence 36 by the transmitter station to verify the availability of the receiver station and a sequence 38 to determine the fixed frequency. The transmission software 30 is described in more detail below with reference to FIGS. 4 and 5.

As a variant, the data transmission means are in the form of programmable logical components, or in the form of dedicated integrated circuits.

Figure 2:
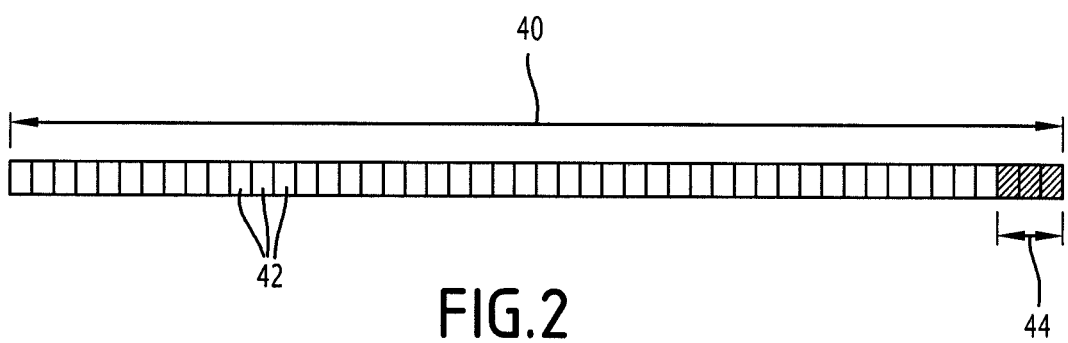
FIG. 2 is an illustration of a synchronous channel when the transmission network is in communication in a first transmission mode.
Figure 3:
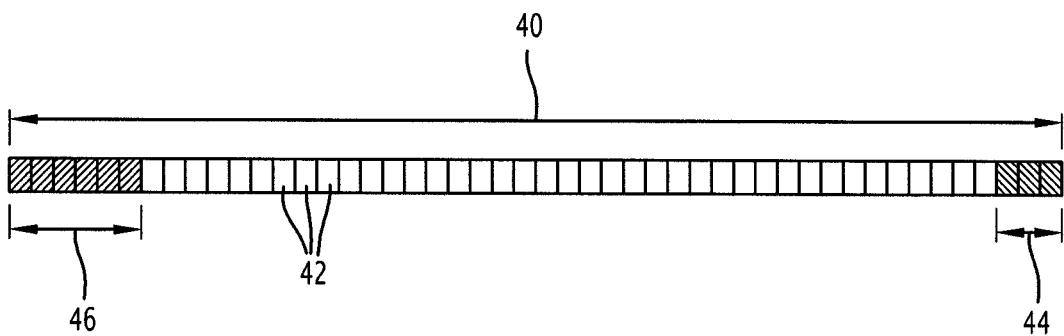
FIG. 3 is an illustration of the synchronous channel and of an asynchronous channel when the transmission network is on general standby in the first transmission mode.

In FIGS. 2 and 3, conforming to standard STANAG-4444, the transmission frame in FH mode is divided into service slots 40, each service slot 40 comprising forty-eight dwell times 42, called FH dwell times. The FH mode is a transmitting mode in which the stations 10 operate with random frequency hopping i.e. in a transmission mode in which the data is carried on dwell times 42 of determined duration. The frequency used for data transmission is maintained for a dwell time 42 and changes from one dwell time to another as per a law of frequency change also called FH law. The duration of a FH dwell time 42 is 112.5 ms and the duration of the service slot 40 is therefore 5.4 s.

When the transmission network is in FH communication mode i.e. when a master station mastering synchronisation between the stations 10 of the network transmits data, the service slot 40 which can be seen in FIG. 2 comprises a synchronous channel 44 corresponding to the three last dwell times 42 of the service slot, and the other dwell times of the service slot 40 are used for transmission of data corresponding to the communication in progress.

When the transmission network is on general standby in FH mode, i.e. when the master station is not in communication, the service slot 40 comprises the synchronous channel 44 and an asynchronous channel 46 as illustrated in FIG. 3. The synchronous channel 44 corresponds to the three last dwell periods 42 of the service slot and the asynchronous channel 46 corresponds for example to the first service slots 42.

Figure 4:
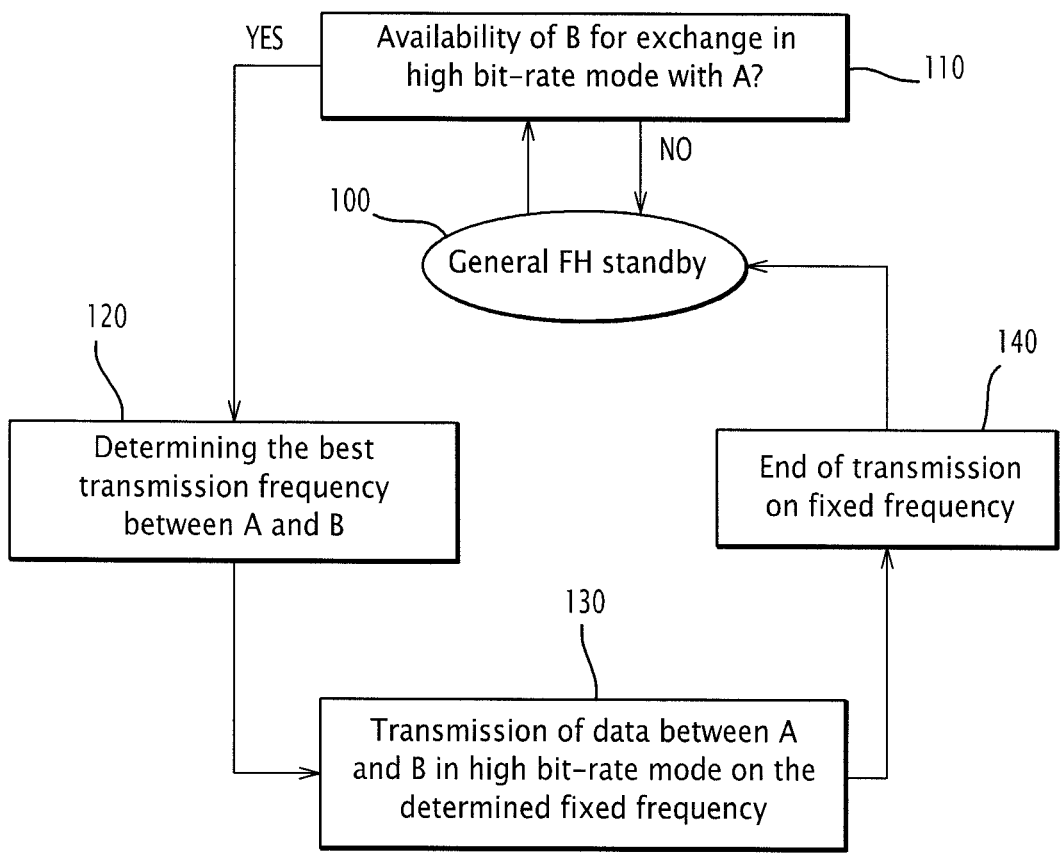
FIG. 4 is a flowchart of a data transmission method according to the invention comprising the first transmission mode and a second transmission mode.
Figure 5:
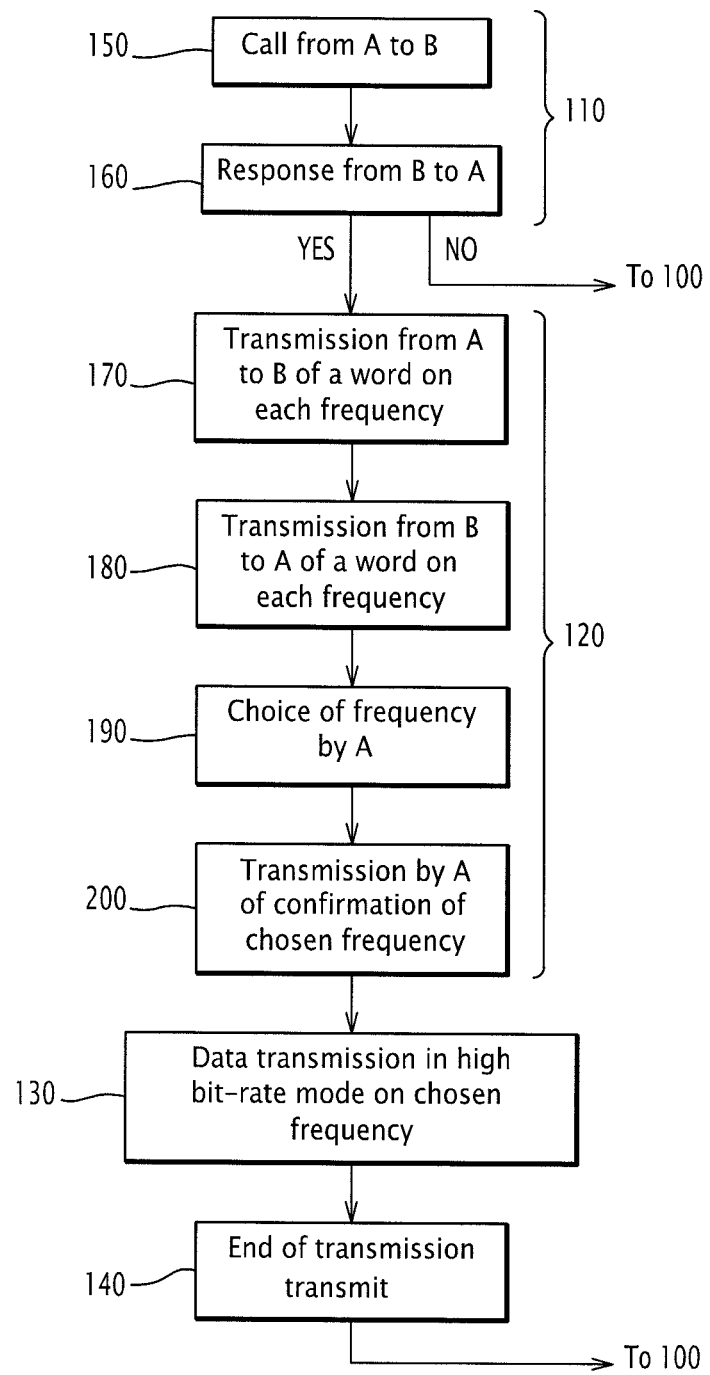
FIG. 5 is a flowchart illustrating the second transmission mode.

The data transmission method will now be described with reference to FIGS. 4 and 5, FIG. 5 illustrating a second transmission mode in particular.

At step 100, the station 10 is on general standby in the first transmission mode (FH mode), the master station of network not being in communication, and then capable of changing over to the second transmission mode, also called the high bit-rate mode, if the user needs to transmit a large quantity of data to another station 10. At step 100, the transmission software 30 performs the first function 32 and is able to call the second function 34.

The first transmission mode has a first maximum transmission rate, e.g. of 2400 bits per second, and the second transmission mode has a second maximum transmission rate of higher value than the first maximum transmission rate. The value of the second maximum rate is for example at least two times higher, preferably at least four times higher, further preferably at least eight times higher than the value of the first maximum rate. The value of the second maximum rate is 19200 bits per second for example or even 9600 bits per second.

When the station 10 called the transmitter station A, wishes to transmit data in high bit-rate mode, it starts by verifying at step 110 the availability of the other station 10, called the receiver station B, for data exchange in high bit-rate mode, the second function 34 of the station A calling the verification sequence 36. If the receiver station B is available, then the second function 34 moves onto step 120, otherwise the station A returns to step 100 on general FH standby in which the transmission software 30 again launches the first function 32.

After verification of the availability of the receiver station B, the stations A and B leave the half-duplex FH of the first transmission mode, and the transmitter station A initiates step 120 to determine the best transmission frequency between A and B. For this purpose, the second function 34 of station A calls the determination sequence 38.

When the stations A and B have determined the best transmission frequency, they then, at step 130, transmit data in high bit-rate mode on the determined fixed frequency. More specifically, the transmitter station A transmits data to the receiver station B on a first fixed frequency, and the receiver station B transmits data to the transmitter station A on a second fixed frequency. In the example of embodiment in FIGS. 4 and 5, the first fixed frequency and the second fixed frequency are of identical value. As a variant, the second fixed frequency has a different value to the first fixed frequency.

The transmission of data in high bit-rate mode and on a fixed frequency is carried out in accordance with standard protocols such as the protocol defined by standard STANAG-4539, or the ARQ protocol defined by standard STANAG-5066.

When two stations A and B transmit data to each other in the second mode, the other stations all transmit data to each other in FH half-duplex according to the first mode.

After the transmission of data in high bit-rate mode, the transmitter station A automatically sends a word at the end of transmission to the receiver station B at step 140, and the two stations A and B then automatically return to step 100 on general FH standby. The two stations A and B again transmit to all the other stations in half-duplex FH. In other words, the transmitter station A and the receiver station B automatically return to this first transmission mode after the transmitting of data in the second transmission mode.

The verification step 110 verifying availability and determination step 120 to determine the fixed frequency will now be described in more detail with the help of FIG. 5.

The verification step 110 comprises a step 150 to send a specific call word by the transmitter station A to the receiver station B indicating its intention to set up communication in high bit-rate mode. On receiving the call, the receiver station B transmits confirmation of receipt to the station A at step 160 if it accepts the communication in high bit-rate mode. If not, the receiver station B does not reply and station A, on receiving no confirmation, interrupts the procedure and returns to general FH standby (step 100).

This verification step 110 therefore allows the verifying of the presence and availability of the receiver station B without having to wait until the end of the step 120 determining the fixed frequency.

The step 120 to determine the fixed frequency then comprises a transmission step 170 by the transmitter station A of a call word on each of the frequencies of the ALE plan for a respective test dwell time. The duration of the test dwell time is equal to the duration of the FH dwell time 42 multiplied by an integer factor, the value of the integer factor being between 1 and 6. In the example of embodiment in FIGS. 4 and 5, the duration of the test dwell time is equal to the duration of the FH 42 dwell time, the multiplying factor being 1. In other words, the duration of the test dwell time is equal to 112.5 ms.

The order of frequency testing is predetermined and is a random order for example. The receiver station B measures the quality of reception of the call word on each of the frequencies.

The determination step 120 then comprises a transmission step 180 by the receiver station B of a response word on each of the frequencies of the ALE plan during a respective test dwell time.

When the first fixed frequency and the second fixed frequency have an identical value such as illustrated in the example of embodiment in FIGS. 4 and 5, the receiver station B then indicates to the transmitter station A, in each response word, the quality of reception of the current frequency. The transmitter station A then determines the single fixed frequency at step 190 by retaining the frequency having the best quality of reception of the call word and of the response word.

As a variant, when the first fixed frequency and the second fixed frequency have separate values, the receiver station B indicates in each response word to the transmitter station A the frequency having the best quality of reception of the call word. The first fixed frequency is then the frequency having the best reception quality of the call word, and the second fixed frequency is the frequency having the best quality of reception of the response word.

The transmitter station A at step 200 finally transmits a confirmation word on the determined fixed frequency.

Therefore the transmission method according to the invention contains a step to determine the fixed frequency that is of short duration since the determination step 120 has a duration of less than 3.5 seconds in the example of a second frequency plan comprising ten frequencies, whereas a determination step of the best fixed frequency according to standards MIL-STD-188-141A or STANAG 4538 (FSLU or RLSU), in the same example of a second frequency plan containing ten frequencies, has a duration of about 100 seconds according to standard MIL-STD-188-141A or about 54 seconds according to standard STANAG 4538. The determination step effectively has a respective duration of about 10 seconds and about 5.4 seconds per frequency tested as per standard MIL-STD-188-141A and as per standard STANAG 4538 respectively.

The transmission method of the invention offers the advantages of a FH half-duplex transmission mode to all stations, such as the synchronisation of the stations within the network, voice broadcasting to the entire network, late entry into the network or break-in calling whilst allowing rapid changeover to high bit-rate mode when the two stations wish to exchange a large quantity of data.

The transmission method is also very easy to use from an operational viewpoint since it does not require any action by the user other than the sending of data to the receiver.

It can therefore be appreciated that the transmission method of the invention allows shortening of the time needed to change over from FH transmission mode to fixed frequency transmission mode, and reciprocally thereby facilitates the combined use of these two transmission modes.

What is claimed is:

1. A method for transmitting data between a plurality of radio stations of a same network, each station comprising a transmitter and a receiver, the method comprising:

operating the network in a first data transmission mode in which the network operates with frequency hopping (FH) in a first frequency plan, the frequency used for data transmission being maintained for a FH dwell time, and changing from one FH dwell time to another according to a frequency change law; and operating the network in a second data transmission mode in a second frequency plan in which a transmitter station from among the plurality of stations transmits data on a fixed frequency to a receiver station among the plurality of stations, the operating the network in the second data transmission mode comprising a step of determining the fixed frequency, the step of determining the fixed frequency comprising transmitting a test word on each frequency of the second frequency plan during a respective test dwell time, the test dwell time being of a duration equal to a duration of the FH dwell time multiplied by an integer factor, the value of the integer factor being between 1 and 6.

2. The method as recited in claim 1 wherein the duration of the test dwell time is equal to the duration of the FH dwell time, the integer factor being 1.

3. The method as recited in claim 1 wherein the operating the network in the second data transmission mode also comprises a step of verifying, by the transmitter station, the availability of the receiver station, the step of verifying preceding the step of determining the fixed frequency.

4. The method as recited in claim 1 wherein the step of determining the fixed frequency comprises transmitting a call word by the transmitter station to the receiver station, then transmitting of a response word by the receiver station to the transmitter station, the call word and the response word being transmitted on each frequency of the second frequency plan, the determined fixed frequency being the frequency having the best quality of reception of the call word and of the response word.

5. The method as recited in claim 4 wherein the transmitter station transmits data to the receiver station on a first fixed frequency and the receiver station transmits data to the transmitter station on a second fixed frequency.

6. The method as recited in claim 5 wherein the first fixed frequency is the frequency having the best quality of reception of the call word, and the second fixed frequency is the frequency having the best quality of reception of the response word.

7. The method as recited in claim 1 wherein the transmitter station transmits data to the receiver station on a first fixed frequency, and the receiver station transmits data to the transmitter station on a second fixed frequency.

8. The method as recited in claim 7 wherein the second fixed frequency has a different value than a value of the first fixed frequency.

9. The method as recited in claim 7 wherein the second fixed frequency is of identical value to a value of the first fixed frequency.

10. The method as recited in claim 1 wherein the first transmission mode has a first maximum transmission rate, and the second transmission mode has a second maximum transmission rate of higher value than the value of the first maximum rate.

11. The method as recited in claim 1 wherein the transmitter station and the receiver station automatically return to the first transmission mode after the transmission of data in the second transmission mode.

12. A transmission network comprising:
a plurality of radio stations, each station comprising a transmitter and a receiver, each station being capable of transmitting data in a first mode in which the network operates with frequency hopping (FH) in a first frequency plan, the frequency used for data transmission being maintained for a FH dwell time and changing from one FH dwell time to another according to a frequency change law, each station being capable of transmitting data in a second frequency plan according to a second mode in which a transmitter station among the plurality of stations transmits data on a fixed frequency to a receiver station, each station configured for determining the fixed frequency and commanding the transmission of a test word on each frequency of the second frequency plan for a respective test dwell time, the test dwell time being equal to the FH dwell time multiplied by an integer factor, the value of the integer factor being between 1 and 6.

13. A transmission network comprising:
a plurality of radio stations, each station comprising a transmitter and a receiver, each station being capable of transmitting data in a first mode in which the network operates with frequency hopping (FH) in a first frequency plan, the frequency used for data transmission being maintained for a FH dwell time and changing from one FH dwell time to another according to a frequency change law, each station being capable of transmitting data in a second frequency plan according to a second mode in which a transmitter station among the plurality of stations transmits data on a fixed frequency to a receiver station, each station comprising means for determining the fixed frequency, the determination means being capable of commanding the transmission of a test word on each frequency of the second frequency plan for a respective test dwell time, the test dwell time being equal to the FH dwell time multiplied by an integer factor, the value of the integer factor being between 1 and 6.

* * * * *